(12) United States Patent
Harley et al.

(10) Patent No.: US 7,787,778 B2
(45) Date of Patent: Aug. 31, 2010

(54) CONTROL SYSTEM FOR A POLAR OPTICAL TRANSMITTER

(75) Inventors: James Harley, Nepean (CA); Douglas McGhan, Ottawa (CA); Mohammad Sotoodeh, Kanata (CA); Anant Grewal, Gloucester (CA); Mark Hawryluck, Kanata (CA)

(73) Assignee: Ciena Corporation, Linthicum, MD (US)

( * ) Notice: Subject to any disclaimer, the term of this patent is extended or adjusted under 35 U.S.C. 154(b) by 164 days.

(21) Appl. No.: 11/067,011

(22) Filed: Feb. 28, 2005

(65) Prior Publication Data

US 2006/0127104 A1    Jun. 15, 2006

Related U.S. Application Data

(63) Continuation-in-part of application No. 11/008,515, filed on Dec. 10, 2004.

(51) Int. Cl.
*H04B 10/00* (2006.01)
(52) U.S. Cl. .................................. 398/195; 398/198
(58) Field of Classification Search .......... 398/182–201
See application file for complete search history.

(56) References Cited

U.S. PATENT DOCUMENTS

| | | | |
|---|---|---|---|
| 5,148,503 A | 9/1992 | Skeie | |
| 5,301,058 A | 4/1994 | Olshansky | |
| 5,311,346 A | 5/1994 | Haas et al. | |
| 5,349,312 A | 9/1994 | Huettner et al. | |
| 5,408,498 A | 4/1995 | Yoshida | |
| 5,416,626 A | 5/1995 | Taylor | |
| 5,446,574 A | 8/1995 | Djupsjobacka et al. | |
| 5,513,029 A | 4/1996 | Roberts | |
| 5,579,328 A | 11/1996 | Habel et al. | |
| 5,761,225 A | 6/1998 | Fidric et al. | |
| 5,892,858 A | 4/1999 | Vaziri et al. | |
| 5,949,560 A | 9/1999 | Roberts et al. | |
| 5,999,258 A | 12/1999 | Roberts | |
| 6,067,180 A | 5/2000 | Roberts | |
| 6,115,162 A | 9/2000 | Graves et al. | |
| 6,124,960 A | 9/2000 | Garthe et al. | |

(Continued)

FOREIGN PATENT DOCUMENTS

EP    0 524 758    1/1993

(Continued)

OTHER PUBLICATIONS

Adaptive Electronic Linearization of Fiber Optic Links, OFC 2003, vol. 2, pp. 477-480, Mar. 2003 Sadhwani et al.

(Continued)

*Primary Examiner*—Agustin Bello
(74) *Attorney, Agent, or Firm*—Kent Daniels; Blake, Cassels & Graydon LLP (57) ABSTRACT

A method of controlling a polar optical transmitter comprising a dual-branch Mach-Zehnder (MZ) modulator driven by a pair of independent electrical drive signals. A cost function is provided which defines a relationship between a control parameter of the optical transmitter and a power level of an output optical signal generated by the MZ modulator. A selected component of the electrical drive signals is dithered using a predetermined dither signal. A modulation depth of the output optical signal power level corresponding to the dither signal is detected, and the control parameter adjusted based on the cost function and the detection result.

48 Claims, 5 Drawing Sheets

U.S. PATENT DOCUMENTS

| | | | |
|---|---|---|---|
| 6,128,111 | A | 10/2000 | Roberts |
| 6,205,262 | B1 | 3/2001 | Shen |
| 6,262,834 | B1 | 7/2001 | Nichols et al. |
| 6,278,539 | B1 * | 8/2001 | Ooi et al. .................... 359/237 |
| 6,304,369 | B1 | 10/2001 | Piehler |
| 6,441,932 | B1 | 8/2002 | Helkey |
| 6,473,013 | B1 | 10/2002 | Velazquez et al. |
| 6,559,994 | B1 | 5/2003 | Chen et al. |
| 6,580,532 | B1 | 6/2003 | Yao et al. |
| 7,075,695 | B2 * | 7/2006 | Gronbach .................. 359/245 |
| 2001/0028760 | A1 | 10/2001 | Yaffe |
| 2002/0018268 | A1 | 2/2002 | Price et al. |
| 2002/0024694 | A1 | 2/2002 | Newell et al. |
| 2002/0106148 | A1 | 8/2002 | Schemmann et al. |
| 2003/0011847 | A1 | 1/2003 | Dai et al. |
| 2006/0127102 | A1 * | 6/2006 | Roberts et al. .............. 398/182 |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Automated Measurement of Polarization Mode Dispersion Using Jones Matrix Eigenanalysis, IEE PhotonicsTechnology Letters, vol. 4, No. 9, pp. 1066-1069, Sep. 1992, Heffner.
Chromatic Dispersion Mapping by Sensing the Power Distribution of Four-Wave Mixing Along the Fiber Using Brillouin Probing, OFC 2003, vol. 2, pp. 714-716, Herraez et al.
Design of Broad-Band PMD Compensation Filters, IEEE Photonics Technology Letters, vol. 14, No. 8, Aug. 2002, A. Eyal et al.
Dispersion Compensation by Active Predistorted Signal Synthesis, Journal of Lightwave Technology, vol. LT-3, No. 4, Aug. 1985, Thomas L. Koch and Rod C. Alfemess.
Dispersion Compensation with an SBS-Suppressed Fiber Phase Conjugator Using Synchronized Phase Modulation, OFC 2003, vol. 2. pp. 716-717, M. Tani.
Electrical Signal Processing Techniques in Long-Haul Fiber-Optic Systems, 1990 IEEE-Transactions on Communications, vol. 38, No. 9, Jack H. Winters, et al.
Exact Compensation for both Chromatic Dispersion and Kerr Effect in a Transmission Fiber Using Optical Phase Conjuction, Journal of Lightwave Technology, vol. 14, No. 3, March.
High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.
Measurement of High-Order Polarization Mode Dispersion, IEEE Photonics Technology Letters. vol. 12, No. 7, Jul. 2000, Yi Li et al.
Mitigation of Dispersion-Induced Effects Using SOA in Analog Optical Transmission, IEEE Photonics Technology Letters, vol. 14, No. 8, Aug. 2002, Duk-Ho Jeon et al.
Performance of Smart Lightwave Receivers With linear Equalization, Journal of Lightwave Technology, vol. 10, No. 6, Aug. 1992, John C. Cartledge, et al.
Polarization Effects in Lightwave Systems, Craig. D. Poole and Jonathan Nage. Date unknown.
Polarization Modulated Direct Detection Optical Transmission Systesm, Journal of Lightwave Technology, vol. 10, No. 12, Dec. 1992.
Predistortion of Electroabsorption Modulators for Analog CATV Systems at 1.55•m, Journal of Lightwave Technology, vol. 15, No. 9, Sep. 1997, Gordon C. Wilson et al.
Predistortion Techniques for Linearization of External Modulators, 1999 IEEE—Gordon Wilson, Lucent Technologies, NJ 07733, U.S. A.
Reduction of Dispersion-Induced Distortion in SCM Transmission Systems by Using Predistortion-Linearized MQW-EA Modulatirs, Journal of Lighwave Technology, vol. 15, No. 2, Fe.
Representation of Second-Order Polarisation Mode Dispersion, Electronics Letters, vol. 35, No. 19, Sep. 16, 1999, A. Eyal et al.
Signal Distortion and Noise in AM-SCM Transmission Systems Employing the Feedfrorward Linearized MQW-EA External Modulator, Journal of Lightwave Technology, vol. 15, No. 8, Au.
Soliton Transmission Using Periodic Dispersion Compensation, Journal of Lightwave Technology, vol. 15, No. 10, Oct. 1997, Nicholas J. Smith et al.
Theoretical Basis of Polarization Mode Dispersion Equalization up to the Second Order, Journal of Lightwave Technology, vol. 18, No. 4, Apr. 2000, Teruhiko Kudou et al.
H. Gysel et al. "Electrical Predistortion to Compensate for Combined Effect of Laser Chirp and Fibre Dispersion", Electronics Letters IEE Stevenage vol. 27, No. 5, Feb 1991.
A. Mecozzi et al. "Cancellation of timing and Amplitude Jitter in Symmetric Links Using Highly Dispersed Pulses", IEEE Photonics Technology Letters, vol. 13, No. 5, May 2001.
Ram Sadhwani, Adaptive CMOS Predistortion Linearizer for Fiber-Optic Links, Journal of Lightwave Technology, vol. 21, No. 12, Dec. 2003.
P.S. Andre, et al., "Extraction of DFB Laser Rate Equation Parameters for Optical Simulation Pusposes", Conftele 1999 ISBN 972-98115-0-4.
Lucas Illing, et al., "Shaping Current Waveforms for Direct Modulation of Semiconductor Lasers", Institute for Nonlinear Science, U.C. San Diego, 2003.
P.M. Watts, et al., "Demonstration of Electrical Dispersion Compensation of Single Sideband Optical Transmission", London Communications Symposium 2003, University College Lon.
Hoon Kim, et al., "10 Gbit/s 177 km transmission over conventional singlemode fibre using a vestigial side-band modulation format" Electronics Letters, vol. 37, No. 25 Dec 6, 2001 pp. 1533-1534.
Henning Bulow, et al., "Dispersion Mitigation Using a Fiber-Bragg-Grating Sideband Filter and a Tunable Electronic Equalizer", Optical Society of America, 2000.
M. Sieben, et al., "10Gbit/s optical single sideband system" Electronics Letters, vol. 33, No. 11, May 22, 1997, pp. 971-973.
Feldhaus G., "Volterra Equalizer for Electrical Compensation of Dispersion and Fiber Nonlinearities", Journal of Optical Communicatinos, Fachverlag Schiele & Schon, Berlin, De, vol. 23, No. 3, Jun. 2002, pp. 82-84, XP001130377, ISSN: 0173-4911.
Schaffer, Troy A. et al "A 2GHz 12-bit Digital-to-Analog Converter for Direct Digital Synthesis Applications", GaAs IC Symposium, pp. 61-64.
Kamoto, T. et al "An 8-bit 2-ns. Monolithic DAC", IEEE Journal of Solid-State Circuits, Feb. 1988, vol. 23, No. 1.

* cited by examiner

Figure 1a
(Prior Art)

Figure 1b
(PriorArt)

Figure 1c
(PriorArt)

CONTROL SYSTEM FOR A POLAR OPTICAL TRANSMITTER

CROSS-REFERENCE TO RELATED APPLICATIONS

This application is a Continuation-in-Part of U.S. patent application Ser. No. 11/008,515, entitled Modulation E-Field Based Control Of A Non-Linear Transmitter, and filed on Dec. 10, 2004.

MICROFICHE APPENDIX

Not Applicable.

TECHNICAL FIELD

The present invention relates to optical signal transmitters for optical communications systems, and in particular to a control system for a polar optical transmitter.

BACKGROUND OF THE INVENTION

For the purposes of understanding the present invention, it is useful to consider a representation of the total optical E-field E(t) as a vector confined to a plane and emanating from a fixed origin, where the length of the vector gives the amplitude of the E-field at any instant (t), and the direction of the vector gives the phase of the field at any instant (t). Within this construction, we consider two basis sets. The first basis set is a Cartesian coordinate system centered on the E-field origin. In this Cartesian representation, the total E-field E(t) is decomposed along the orthogonal Real (Re) and Imaginary (Im), or, equivalently, In-phase (I) and Quadrature (Q), directions. The second basis set is a polar coordinate system, again sharing its origin with that of the E-field vector. In this polar representation, the E-field is decomposed into vector length (S) and phase angle ($\phi$) relative to the Re-direction. These two basis sets are related by a non-linear transformation, in a manner well known in the art. In each of these representations, the time-sequence of loci of the end-point of the E-field vector may be referred to as a trajectory of the E-field.

Figure 1A:
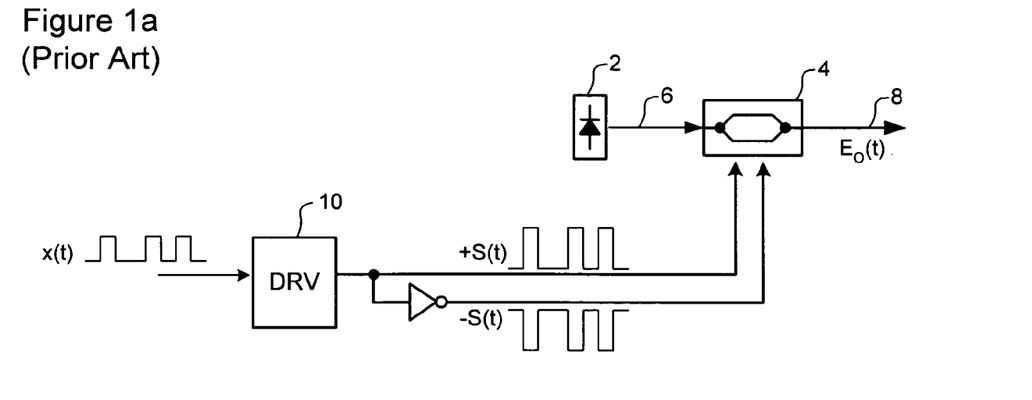
FIGS. 1a-1e schematically illustrate principal components and operation of an optical transmitter known in the prior art.

In the optical communications space, various techniques are used to synthesize an optical communications signal for transmission. A popular technique utilizes a laser 2 coupled to an external Electrical-to-Optical (E/O) converter 4, as shown in FIG. 1a. The laser 2 generates a narrow-band continuous wave (CW) optical carrier signal 6 having a desired wavelength. The E/O converter 4 operates to modulate the amplitude and/or phase of the carrier signal 6 to generate the optical communications signal 8 based on one or more drive signals S(t) generated by a driver circuit 10 based on an input data signal x(t).

In the arrangement illustrated in FIG. 1a, the E/O converter 4 is provided by a well known Mach-Zehnder (MZ) interferometer. Other types of E/O converters may be used, depending on the desired type of modulation. For example, an electro-absorptive E/O converter (EAM) or a variable optical attenuator (VOA) may be used for amplitude modulation, whereas phase shifters are well known for implementing phase modulation schemes. In each case, the driver circuit 10 generates the drive signals S(t), primarily by scaling the input data signal x(t) to satisfy the voltage and current requirements of the E/O converter 4. In some cases, the input data signal x(t) is encoded in accordance with a desired modulation scheme (e.g. for quadrature encoding), and the resulting encoded data signal scaled to satisfy the voltage and current requirements of the E/O converter 4. The format of the drive signal S(t) output from the driver circuit 10 is principally governed by the desired modulation scheme, and will typically take the form of a baseband (i.e., binary, direct current) signal; a coded (e.g. quadrature encoded) signal; or a modulated electrical (e.g. radio frequency) carrier signal. In addition, each drive signal may also be generated in the form of a differential signal pair ±S(t), which provides certain advantages known in the art. In all cases, the drive signals S(t) are directly modeled on the input data signal x(t), and represent the data to be modulated onto the CW carrier 6. This is true even where an encoding scheme, such as quadrature encoding, is used.

Figure 1B:
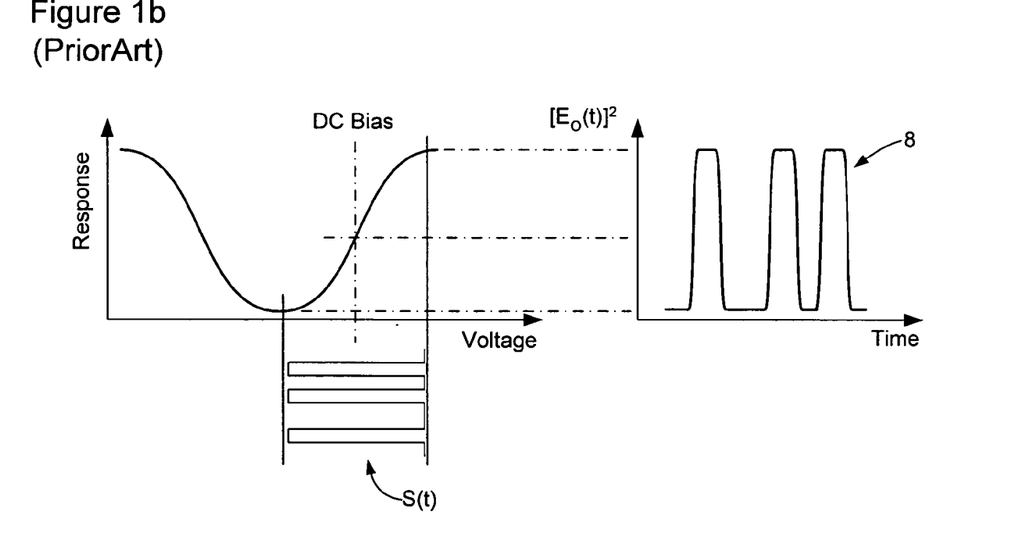
Figure 1C:
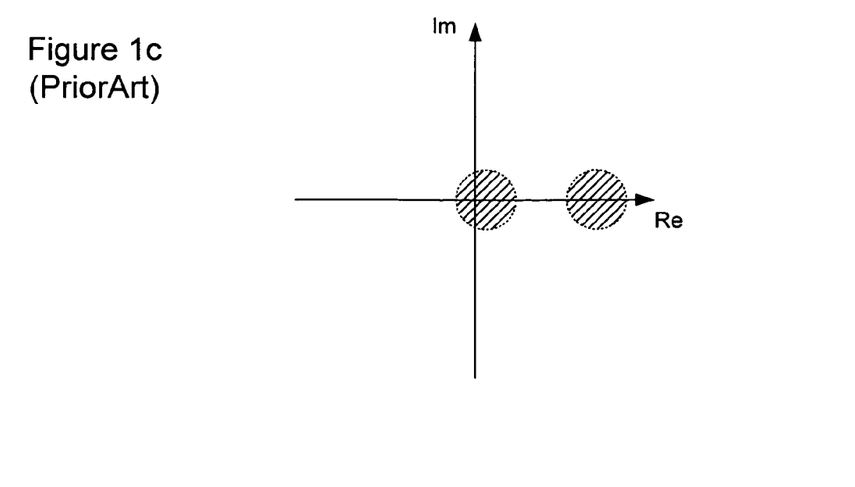

For example, FIGS. 1a and 1b illustrate a conventional transmitter in which an input data signal x(t) is transmitted using the well known On-Off Keying (OOK) modulation scheme. As may be seen in FIG. 1a, the driver 10 scales the input data signal x(t) to produce a differential pair of bi-state (that is two-level) baseband drive signals ±S(t). The baseband drive signal pair ±S(t) is then used to drive excursions of the E/O converter's (sinusoidal) amplitude response between maximum and minimum transmittance, as may be seen in FIG. 1b. This operation yields an amplitude-modulated optical communications signal 8 having an optical E-field $E_O(t)$ which exhibits excursions of amplitude between two states reflecting the binary values of each bit of the input data signal x(t), as shown in FIG. 1c, in which the optical E-field $E_O(t)$ is represented in the complex Re/Im plane. As may be seen in FIG. 1c, amplitude modulation of the CW carrier 6 in the above manner results in excursions of the optical E-field $E_O(t)$ between loci clustered about two points on the real (Re) axis. Ideally, all of the E-field loci will be located on the real (Re) axis. However, in practice the optical E-field $E_O(t)$ will also exhibit excursions in the imaginary (Im) direction due to phase chirp resulting from coupling of phase and amplitude responses of all real electro-optical devices.

Figure 1D:
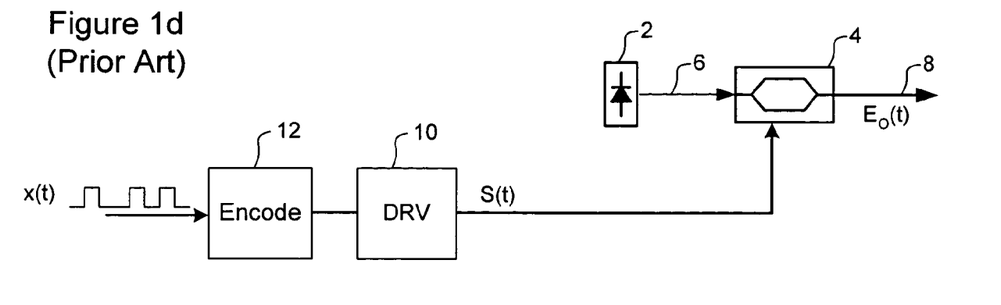
Figure 1E:
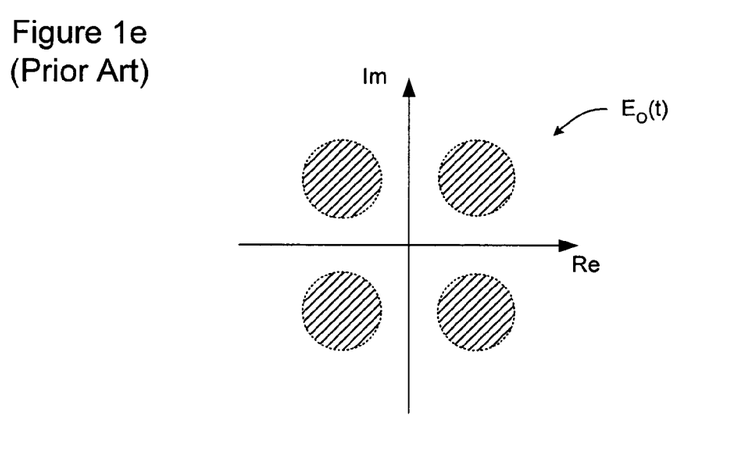

FIG. 1d illustrates an arrangement in which the input data signal x(t) is encoded by an encoder block 12 prior to scaling. Various encoding schemes are known in the art. For example, U.S. Pat. No. 6,522,439 (Price et al), teaches an arrangement in which the input data signal x(t) is split into a pair of parallel In-phase (I) and Quadrature (O) signal components (i.e. the sine and cosine of the data signal x(t)), which are then modulated onto an electrical (RF) carrier and scaled to yield a corresponding pair of drive signals $S_I(t)$ and $S_Q(t)$. U.S. Pat. No. 5,892,858 (Vaziri et al) teaches another arrangement in which the input data signal x(t) is sampled to generate a duo-binary encoded signal, which is then scaled to generate the drive signal. It is also known to quadrature encode the input data signal x(t) prior to scaling. In this case, the input data signal x(t) is divided into successive 2-bit symbols. The stream of symbols is then supplied to the driver circuit 10, which outputs a quad-state (i.e. four-level) drive signal S(t). Driving the phase response of the E/O converter 4 with the quadrature-encoded quad-state drive signal S(t) yields a communications signal 8 having an optical E-field $E_O(t)$ which exhibits phase excursions between four discrete states reflecting the binary values of each 2-bit symbol. This is illustrated in FIG. 1e, in which the optical E-field $E_O(t)$ is represented in the complex Re/Im plane. As may be seen in FIG. 1e, quadrature phase shift modulation of the CW carrier 6 in the above manner results in excursions of the E-field E(t) between loci clustered about four points which are roughly symmetrically distributed about the origin. Here again, scatter of the E-field loci is a function of phase and amplitude distortions due to phase/amplitude response coupling.

Figure 2:
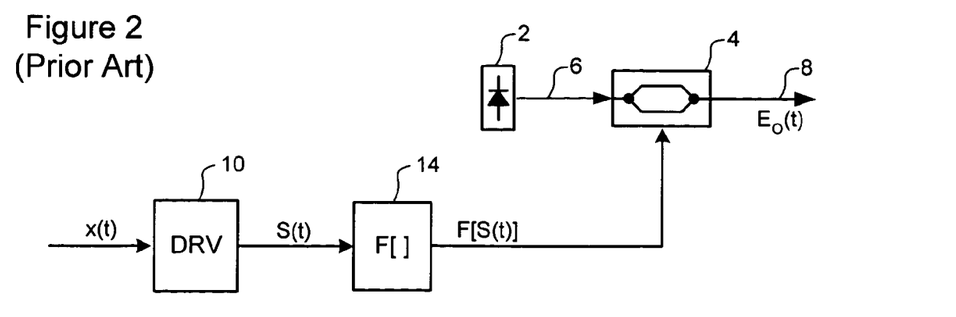
FIG. 2 schematically illustrates principal components of an optical transmitter implementing electrical precompensation of optical distortions known in the prior art.

In addition to data encoding, it is also known to provide various analog electrical signal processing functions in order to modify the drive signals S(t). For example, U.S. Pat. No. 6,522,439 (Price et al.), U.S. Pat. No. 6,574,389 (Schemmann et al.), and U.S. Pat. No. 6,687,432 (Schemmann et al.) teach optical transmitters which compensate chromatic dispersion (or, more generally, odd order distortions) of an optical link by predistorting the drive signals. As shown in FIG. 2, these systems provide a signal distorter 14 between the driver circuit 10 and the E/O converter 4. Thus, the drive signal 10 (in any of baseband, coded, or modulated electrical carrier formats) is supplied to the signal distorter 14 which imposes a dispersive function F[ ] on the drive signal S(t). The resulting distorted drive signal F[S(t)] is then supplied to the E/O converter 4 to generate a predistorted optical communications signal for transmission through the link.

In each of the above-noted patents, the signal distorter 12 is provided by an analog filter circuit (not shown) having a group delay characteristic selected to counteract chromatic dispersion of the link. Multiple filter circuits may be cascaded to compensate some other distortions. For example, Schemmann et al. teach that the (typically squaring response) of an optical receiver can also be precompensated at the transmitter, by means of a suitable filter circuit within the signal distorter 12.

A common characteristic among all of the above-noted predistortion techniques is that analog filter circuits are used to distort an otherwise conventionally generated (and thus conventionally formatted) analog drive signal S(t). The premise is that distorting the drive signal S(t) will suitably distort the optical signal 8 in such a way as to offset distortions due to impairments of the optical link. While this approach is satisfactory for compensating linear distortions (such as chromatic dispersion, and receiver squaring effects) it cannot compensate non-linear impairments such as SPM and four-wave mixing. Quite apart from the limitations inherent to analog filter circuits, all of which are well known, compensation of non-linear distortions is complicated by the fact that all real electro-optical devices (i.e. lasers, E/O converters etc.) exhibit a response in both phase and amplitude to changes in drive voltage (or current). This coupling of phase and amplitude responses means, for example, that any change in drive signal voltage required to produce a desired change in the optical E-field amplitude also produces a transient phase change (chirp), and vise-versa. Further complicating this situation is that the overall system response, in terms of changes in the output optical E-field (amplitude and/or phase) due to changes in drive signal voltage (or current) tends to be highly non-linear. As a result, the prior art techniques for compensating linear distortions (such as chromatic dispersion) by applying a dispersive function F[ ] to the drive signals S(t) typically results in compounding the effects of system non-linearities.

Figure 3A:
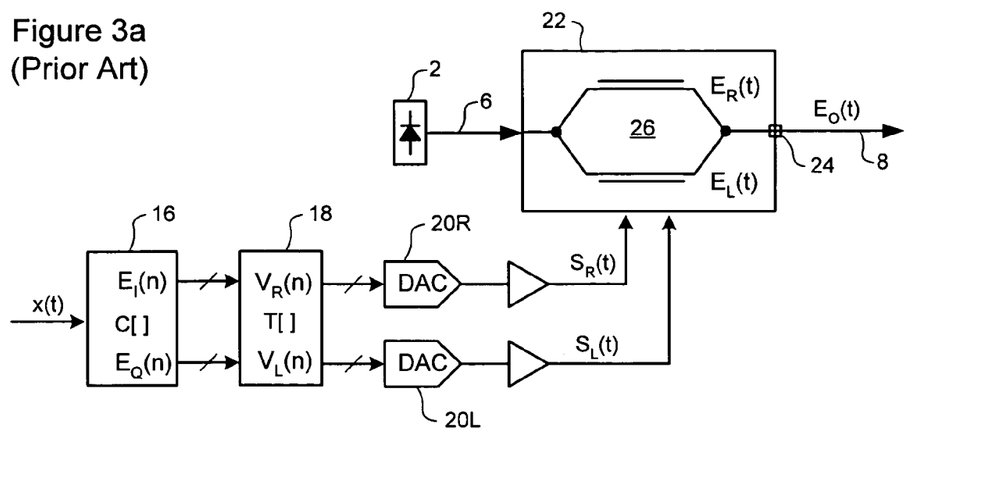
FIGS. 3a-3c schematically illustrates principal components and operation of an optical transmitter implementing digital synthesis of an arbitrary complex optical E-field waveform, known from Applicant's co-pending U.S. Patent Applications Nos. 10/262,944, filed Oct. 3, 2002; Ser. No. 10/307, 466 filed Dec. 2, 2002; and Ser. No. 10/405,236 filed Apr. 3, 2003, and International Patent Application No. PCT/CA03/01044 filed Jul. 11, 2003.

Applicant's co-pending U.S. patent applications Ser. Nos. 10/262,944, filed Oct. 3, 2002; Ser. No. 10/307,466 filed Dec. 2, 2002; Ser. No. 10/405,236 filed Apr. 3, 2003; and Ser. No. 10/677,223, filed Oct. 3, 2003, the contents of all of which are hereby incorporated herein by reference, and International Patent Application No. PCT/CA03/01044 filed Jul. 11, 2003 describe techniques for compensating both linear and non-linear impairments in an optical link by using a multi-bit digital signal path to generate the drive signals S(t). Thus, a signal processor 16 receives the input data signal x(t) as an input, and uses a compensation function C[ ] to compute successive multi-bit In-phase and Quadrature values ($E_I(n)$ and $E_Q(n)$, respectively) representing successive loci of the end-point of a desired or target optical E-field vector. A linearizer 18 then uses the multi-bit ($E_I(n)$, $E_Q(n)$) loci to synthesize a pair of multi-bit digital drive signals $V_R(n)$ and $V_L(n)$. The digital drive signals $V_x(n)$, in which x is an index identifying the involved branch of the signal path, are then converted into analog (RF) signals by respective high speed multi-bit Digital-to-Analog Converters (DACs) 20, which are then amplified (and possibly band-pass filtered to remove out-of-band noise) to generate the drive signals $S_x(t)$ supplied to an E/O converter 22. The digital drive signals $V_x(n)$ are computed such that the drive signals $S_x(t)$ supplied to the E/O converter 22 will yield an optical E-field $E_O(t)$ at the E/O converter output 24 that is a high-fidelity reproduction of the target E-field computed by the signal processor 16.

In general, the signal processor 16 is capable of implementing any desired mathematical function, which means that the compensation function C[ ] can be selected to compensate any desired signal impairments, including, but not limited to, dispersion, Self-Phase Modulation (SPM), Cross-Phase Modulation (XPM), four-wave mixing and polarization dependent effects (PDEs) such as polarization dependent loss. In addition, the compensation function C[ ] can be dynamically adjusted for changes in the optical properties of the link, and component drift due to aging. The inherent flexibility of the mathematical function implemented by the signal processor 16 also implies that the signal processor 16 can be placed into a "test" mode, and used to generate ($E_I(n)$, $E_Q(n)$) loci of a desired optical E-field vector independently (or even in the absence) of an input data signal x(t).

The linearizer 18 can also implement any desired mathematical function, and thus can perform signal format conversion (i.e. from Cartesian to polar coordinates); compensate for non-linearities in the signal path between the linearizer 18 and the output 24 of the E/O converter 22; and perform various scaling and clipping operations to limit dynamic range requirements of electrical components downstream of the linearizer 18 (principally the DACs 20).

The resolution of each analog drive signal $S_x(t)$ is governed by that of the DACs 20. In general, each DAC 20 has a resolution of M-bits, where M is an integer, which yields excursions of each analog drive signal $S_x(t)$ between $2^M$ discrete levels. It will be noted that M=1 represents a trivial case, in which each analog drive signal $S_x(t)$ is a bi-state signal similar to that produced by the conventional driver circuits described above with reference to FIGS. 1 and 2. In applicant's co-pending U.S. patent applications Ser. Nos. 10/262,944, filed Oct. 3, 2002; Ser. No. 10/307,466 filed Dec. 2, 2002; Ser. No. 10/405,236 filed Apr. 3, 2003; and Ser. No. 10/677,223, filed Oct. 3, 2003, and International Patent Application No. PCT/CA03/01044 filed Jul. 11, 2003, M is greater than 4.

The E/O converter 22 will normally be provided as either nested MZ interferometers, or as a conventional dual branch MZ interferometer, as illustrated in FIG. 3. In this latter configuration, each branch of the MZ modulator is driven with a respective one of the analog drive signal $S_x(t)$ so as to perform polar (i.e. phase and amplitude) modulation of the E-field of the optical carrier 6. This solution is particularly advantageous in that it enables arbitrary E-field modulation using readily available (and relatively low-cost) optical components.

Multi-bit digital generation of the drive signals $S_x(t)$ in this manner enables the optical transmitter to synthesize any desired E-field waveform at the output 24 of the polar E/O converter 22. Because the linearizer 18 synthesizes the digital drive signals $V_x(n)$ based on a model of the target optical E-field (as opposed to the data signal being transmitted), it is possible to derive a mathematical representation of the entire data path between the signal processor 16 and the E/O converter output 24, which enables phase and amplitude of the output E-field $E_O(t)$ to be independently controlled, even with significant coupling of phase and amplitude responses of the polar E/O converter 22. This is an operational feature which is simply not possible in prior art transmitters.

An implicit limitation of this technique is that accurate synthesis of a desired optical E-field waveform at the E/O converter output 24 is contingent upon satisfying a number of criteria, including (but not necessarily limited to):

the drive signals $S_x(t)$ must be supplied to respective branches of the E/O converter 22 with substantially zero phase and amplitude error;

generation of the drive signals must take into account the known response of the E/O converter 22, as well as "component drift" due to changes in temperature, and aging; and the E/O converter must be driven to an optimal bias point.

In addition to the inherent phase/amplitude response coupling and non-linearity of real electro-optical components, satisfying these criteria is complicated by the fact that each of the devices in the signal paths traversed by the drive signals $S_x(t)$ are subject to manufacturing variations, as well as component drift due to temperature, aging and (in some cases) mechanical stress. As a result, an exact match between the two signal paths is not practicable.

A known method for dynamically controlling an E/O converter 4 of the type described above with reference to FIGS. 1-3, is to implement one or more control loops using a dither signal inserted into the drive signal S(t). Typically, such a dither signal takes the form of a low frequency sinusoidal analog signal that is added to the drive signals S(t), and detected in the optical signal at some point downstream of the E/O converter 4. Differences (typically of amplitude) between the added and detected dither signals provide a direct indication of gain, from which other performance characteristics may be inferred. The frequency of the dither signal is typically selected to be low enough to avoid interference with data traversing the signal path, but high enough to avoid being attenuated by low-frequency cut-off.

Figure 3B:
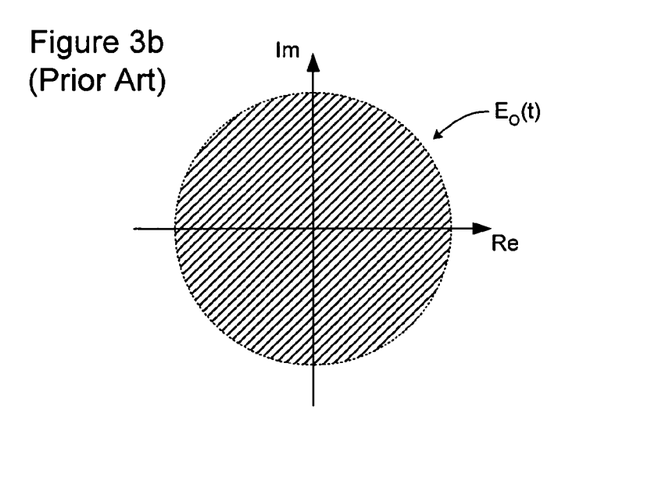
Figure 3C:
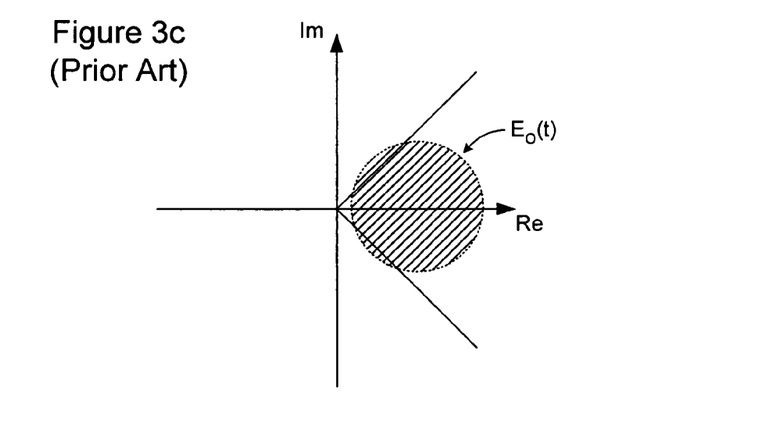

However, these techniques assume that the drive signal $S_x(t)$ is formatted to drive the amplitude (or phase) response of the E/O converter between two states, as described above with reference to FIGS. 1a-c. For various reasons, these conventional techniques become progressively less accurate as the number of states increases (as in, for example, quadrature phase modulation described above with reference to FIGS. 1d-e). In the extreme cases of the dispersion compensated drive signals, using either the dispersive function F[ ] of FIG. 2 or the high-resolution signals of FIGS. 3a-c, conventional control loop techniques cannot distinguish between output optical signal variations due to the dispersive or compensation functions F[ ], and C[ ], respectively, from those produced by the dither signal. Furthermore, the conventional control loop techniques fail entirely in a situation where the drive signals $S_x(t)$ are formatted to simultaneously drive desired excursions of both the phase and amplitude response of the E/O converter 22, as in the embodiment of FIGS. 3a-c.

Accordingly, methods and apparatus for cost-effectively controlling a polar optical transmitter to accurately synthesize a desired optical E-field waveform remains highly desirable.

SUMMARY OF THE INVENTION

Accordingly, an object of the present invention is to provide methods and apparatus for modulating the E-field of an optical carrier signal.

Thus, an aspect of the present invention provides a method of controlling a polar optical transmitter comprising a dual-branch Mach-Zehnder (MZ) modulator driven by a pair of independent electrical drive signals. A cost function is provided which defines a relationship between a control parameter of the optical transmitter and a power level of an output optical signal generated by the MZ modulator. A selected component of the electrical drive signals is dithered using a predetermined dither signal. A modulation depth of the output optical signal power level corresponding to the dither signal is detected, and the control parameter adjusted based on the cost function and the detection result.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and apparatus for controlling a complex optical synthesizer in which a single dual drive Mach-Zehnder (MZ) modulator is used to modulate both the phase and amplitude of a continuous wave (CW) optical carrier. Embodiments of the invention are described below, by way of example only, with reference to FIGS. 4-6.

Figure 4:
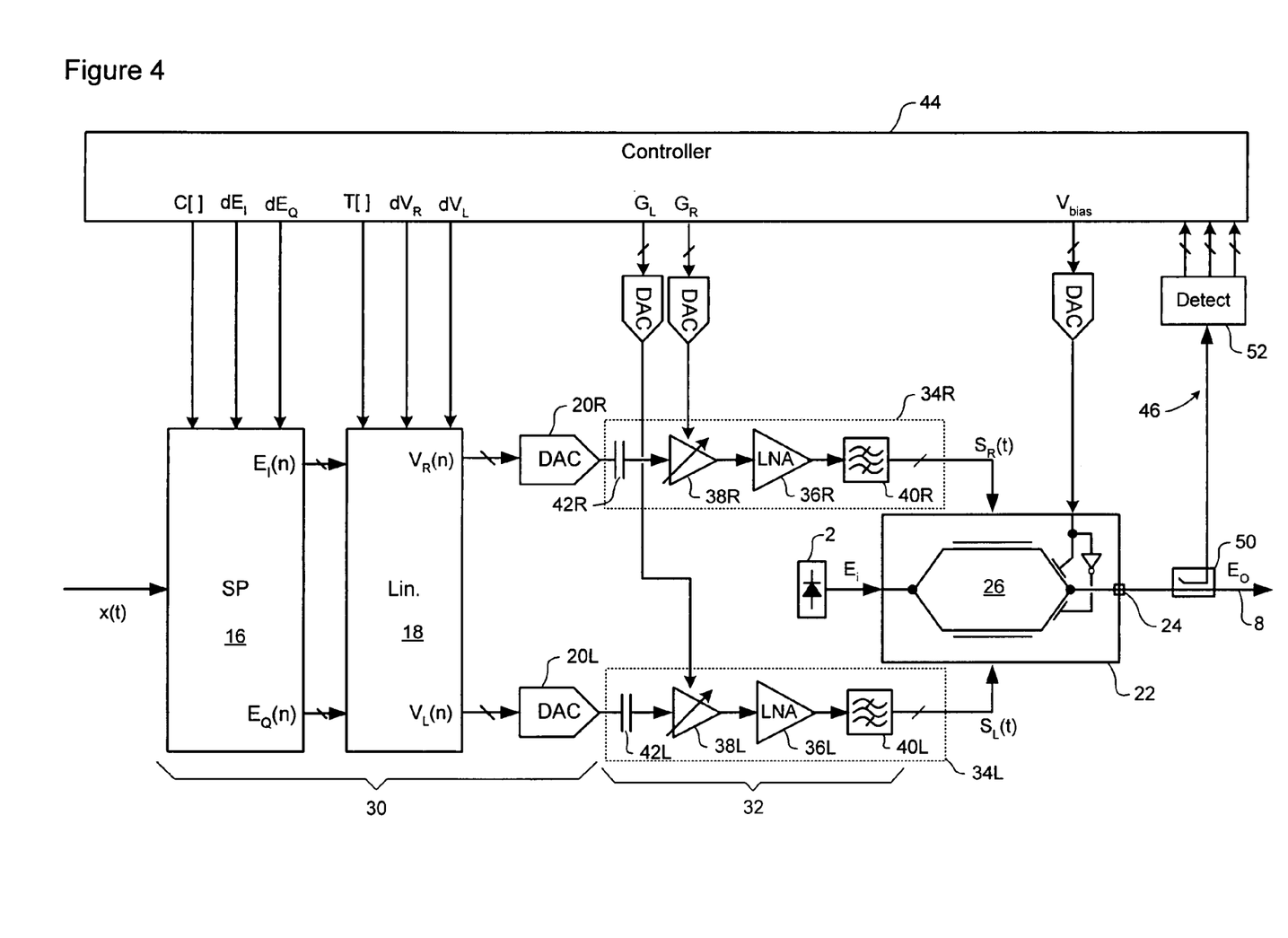
FIG. 4 schematically illustrates the complex communications signal synthesizer of FIG. 3 in greater detail, and further illustrates principal components and operation of a control system in accordance with an embodiment of the present invention.

FIG. 4 is a block diagram schematically illustrating a control system in accordance with the present invention, for controlling a flexible non-linear optical transmitter of the type described above with reference to FIG. 3.

For the purposes of the present invention, it is useful to consider the transmitter as comprising a high speed "signal path" between the signal processor 16 and the output 24 of the E/O converter 22. This signal path comprises a high speed, multi-bit digital stage 30 cascaded with an analog radio-frequency (RF) stage 32, which, in turn, drives the complex E/O converter 22. As shown in FIG. 3a and in more detail in FIG. 4, the multi-bit digital stage 30 includes the signal processor 16, linearizer 18 and multi-bit DACs 20x, where x is an index identifying a respective branch of the signal path.

The analog stage 32 can usefully be considered as being divided into parallel branches 34, each of which comprises a (fixed gain) low-noise amplifier 36 and a variable gain amplifier (VGA) 38 to scale the DAC output and thereby generate a respective RF drive signal $S_x(t)$. If desired, each branch 34 may also include a band-pass filter 40 to attenuate out-of-band noise, and a DC-blocking capacitor 42 in order to prevent DC current drain from the DAC 20. Each RF drive signal $S_x(t)$ is supplied to a respective branch of the E/O converter 22, so as to generate a corresponding branch optical signal $E_x(t)$. The branch optical signals $E_x(t)$ are combined at the E/O converter output 24 to produce the output optical signal $E_O(t)$ 8.

The high speed digital stage 30 of the signal path is preferably driven at a sample rate of at least double the expected bit rate of the input data signal x(t), in order to satisfy Nyquist's criteria for the input data signal x(t). This is primarily an operational consideration, which ensures that the output optical signal 8 will contain sufficient information to enable recovery of the input data signal x(t) at a receiver-end of the link. In principal, any sample rate may be used, although higher sample rates will be preferred. Each of the DACs 20x is designed to provide digital-to-analog conversion at a resolution of M-bits, where (M) is greater than 2. The actual resolution chosen for the DACs is a balance between precision and cost. Increasing the number of bits resolution of the DACs 20x improves the accuracy of synthesis of the output optical E-field $E_O(t)$, but also increases cost. In practice, a resolution of M=6 bits has been found to provide satisfactory precision without unnecessarily increasing costs.

In the embodiment of FIG. 4, the E/O converter 22 is provided by a dual branch Mach-Zehnder (MZ) interferometer 26. Each branch 28x of the MZ interferometer 26 is independently driven by a respective one of the branch drive signals $S_x(t)$. The E/O converter 22 also includes a respective direct-current (DC) input port which supplies a bias signal to its respective MZ interferometer.

It will be appreciated that the arrangement illustrated in FIG. 4 is suitable for implementing accurate synthesis of a desired output optical signal having a single polarization direction. However, the skilled artisan will recognise that this architecture can readily be extended to provide accurate optical synthesis in two orthogonal polarization directions. In a simple example, the entire signal path can be duplicated and run in parallel, with each signal path controlling a respective polarization direction. A preferred option, however, would be to utilize a single high speed digital stage 30 to compute digital drive signals $V_x(n)$ for both polarization directions. This enables the signal processor 16 and linearizer 18 to also control the polarization state of the output optical signal $E_O(t)$, which facilitates compensation of, for example, polarization mode dispersion and polarization dependent loss.

As shown in FIG. 4, a control system in accordance with an embodiment of the present invention comprises a controller unit 44, and a feedback path 46 which samples the optical signal $E_O(t)$ at the E/O converter output 24. In operation, the controller unit 44, which may be provided as any suitable combination of hardware and software, implements a set of parallel control loops for controlling a variety of parameters of the signal path, such as: the target optical E-field (via the compensation function C[ ]); the digital drive signals (via the linearizer transfer function T[ ]), RF stage path gain (via the VGAs), and E/O converter bias. Each control loop involves injecting one or more dither signals into the signal path; detecting artefacts of these dither signals within the output optical signal $E_O(t)$; using the detected artefacts to compute one or more cost-function values that are indicative of an error between the target E-field and the actual E-field of the output optical signal; and, based on the results of the cost-function calculations, adjusting one or more parameters of the signal path so as to optimize transmitter performance, and thereby minimize the error.

As shown in FIG. 4, the feedback path 4b comprises an optical coupler 50, such as a conventional 20 dB coupler for sampling the output optical signal, and a detector block 52 for detecting predetermined artefacts within the sampled optical signal. As may be seen in FIG. 5, the detector block 52 includes a P-Intrinsic-N (PIN) diode 54 which emits a current $I_{PIN}$ that is proportional to a power level of the sampled optical signal. The PIN diode output is sampled by an Analog-to-Digital A/D converter 56, and the sample values supplied to a set of normalized correlators 58, each of which is controlled, in a manner known in the art, to detect signal components of a respective predetermined frequency. The output of each normalized correlator 58 is proportional to the power level of the detected signal components, and is supplied to the controller unit 44.

Figure 6:
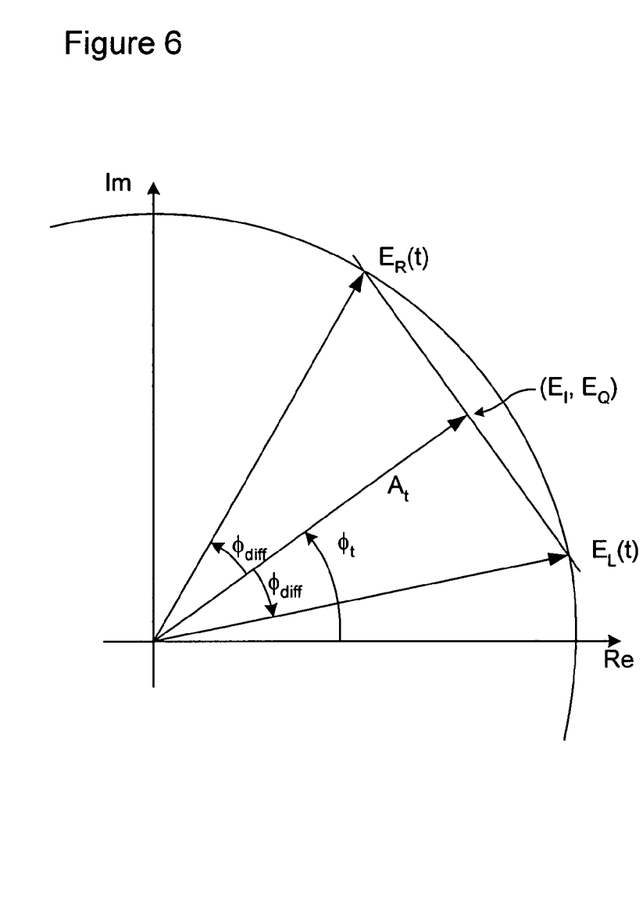
FIG. 6 illustrates phase angles and nomenclature used in the description of the present invention.

As mentioned above, the drive signals $S_x(t)$ are formatted to drive phase and amplitude excursions of the output optical signal $E_O(t)$. As is known in the art, each branch 28x of an MZ interferometer comprises an electro-optic variable phase shifter. Consequently, the branch optical signals $E_x(t)$ are phase-shifted versions of the CW carrier 6 produced by the laser 2, which are combined at the E/O converter output 24 to produce the output optical signal $E_O(t)$ having excursions of both phase and amplitude. It is therefore useful to consider each branch optical signal $E_x(t)$ as a unit vector extending from the origin of the complex (Re/Im) plane, as may be seen in FIG. 6 in which the endpoint loci ($E_I$, $E_Q$) of the target optical E-field (of amplitude $A_t$, and phase $\phi_t$) is also illustrated. Following the vector diagram of FIG. 6, each digital branch drive signal $V_x(n)$ can be formulated as:

$$V_R(n) = \frac{G_{digital,R}}{\pi} \cdot (\phi_t + \phi_{diff})$$

$$V_L(n) = \frac{G_{digital,L}}{\pi} \cdot (\phi_t - \phi_{diff})$$

where: $G_{digital,x}$ is the digital gain of the linearizer transfer function T[ ], and $\phi_{diff}$ is the phase differential between the two branch optical signals $E_x(t)$ required to produce the desired target amplitude $A_t$ through vector addition. Thus:

$$\phi_{diff} = \arccos(A_t) = \arccos\left(\sqrt{E_I^2 + E_Q^2}\right) \quad \text{(Eq. 4)}$$

It may be noted that strict vector addition of the branch optical signals $E_x(t)$ will actually produce a vector of length $2A_d$. However, in a conventional dual branch MZ interferometer, the branch optical signals $E_x(t)$ are combined using a balanced optical signal combiner having two outputs, only one of which is used for the output optical signal 8. Consequently, the output optical signal 8 represents only half of the total optical power of the branch optical signals $E_x(t)$, and this power-division is accounted for in the illustration of FIG. 6.

The RF drive signals $S_x(t)$ supplied to the E/O converter 22 will be:

$$S_x(t) = G_{ANALOG\_x} \cdot G_{DAC} \cdot V_x(n)$$

Where $G_{DAC}$ is the DAC gain and $G_{ANALOG\_x}$ is the path gain of the analog stage 32, between the output of the DAC 20 and the E/O converter output 24.

Dither Signals

For the purposes of the present invention, a "dither signal" can be any signal having a known frequency that is inserted into the signal path, and yields detectable artefacts in the output optical signal $E_O(t)$. These artefacts may take the form of optical power modulation at a frequency corresponding to one or more harmonics of a single dither, a beat of two or more dithers, and/or functions of these, as will be described in greater detail below.

The dither signal can be composed of any of: a pure tone (i.e. a sinusoidal signal); a modulated tone; or a digital signal, which may be periodic (e.g. a clock signal), pseudo-random, or may contain data (e.g. control channel signalling), and can be inserted at any suitable point into the signal path. Typically, the dither signal frequency will be selected to avoid overlap with other dither signals (and/or their harmonics), and to avoid interference with input data x(t) traversing the signal path. Dither frequencies of 1 MHz and below are preferred. Representative dithers that are contemplated in the present invention include:

(a) An E-field vector inserted at a selected phase offset (e.g. ±45°) to the target E-field or at a selected frequency offset from the target E-field (e.g. as a narrow side-band);

(b) A variation of the amplitude and/or phase of the target E-field, or, similarly, of the Real (Re) and imaginary (Im) components of the target E-field;

(c) An additive or multiplicative variation of one or both of the digital drive signals;

(d) Swapping between two or more different linearizer transfer functions T[ ];

(e) a sinusoidal or digital variation of the RF path gain, via the VGAs; and (f) sinusoidal or digital variation of the E/O converter bias.

Dithers a) and b) above can be implemented by suitable control of the signal processor 16, and in particular by suitable selection of the parameters of the compensation function C[ ].

Dithers c) and d) above can be implemented in the linearizer 18. Additive and/or multiplicative variations of the digital drive signals $V_x(n)$ can be implemented by suitable selection of parameters of the linearizer transfer function T[ ]. It is worth noting that this operation can be implemented to independently insert dithers into the Re and Im components of the output optical signal $E_O(t)$. Since the dithers are orthogonal, the resulting artefacts in the output optical signal $E_O(t)$ will also be orthogonal, and thus will not interfere. Swapping between different transfer functions can be accomplished in various ways, such as, for example, by toggling between respective pages of a Random-Access Memory Look-Up Table (RAM-LUT) implementing the linearizer 18.

Dithers e) and f) are similar to conventional dithers, in that they are additive signals which vary the amplitude of the drive signals and/or bias signals in a conventional manner.

Specific dithers will be described below with reference to the control loops within which they are used.

Cost Functions

Figure 5:
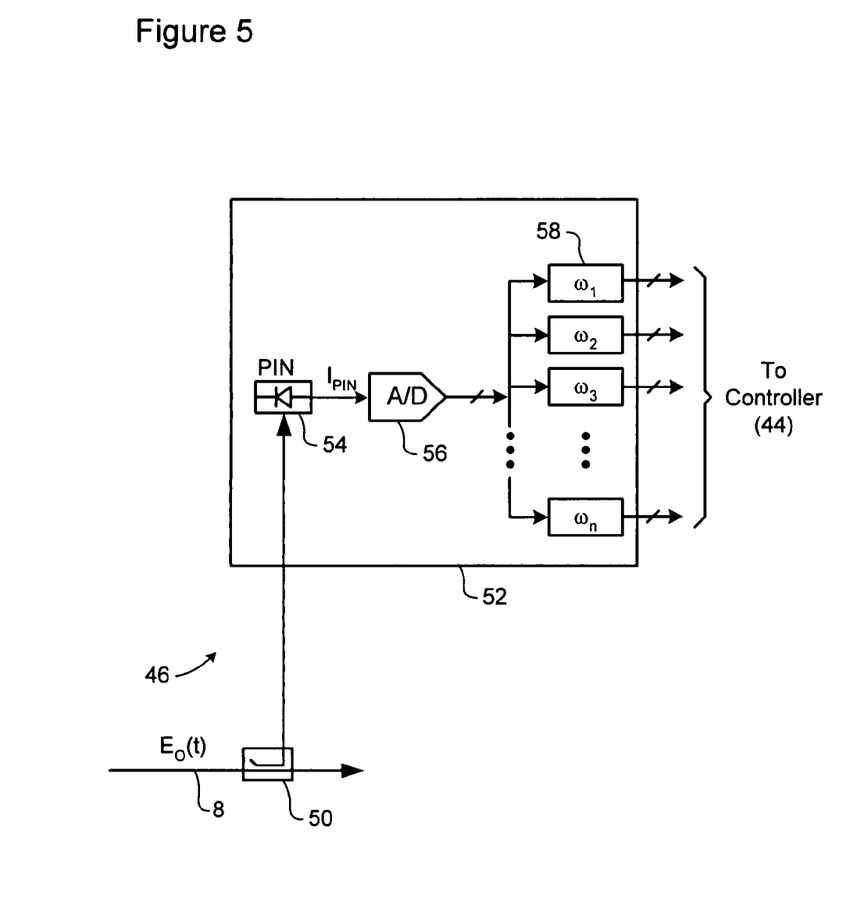
FIG. 5 illustrates a representative detector block usable in the control system of FIG. 4.

As mentioned above, the controller unit 44 computes a cost function value which is indicative of an error between the actual output optical signal E-field $E_O(t)$ and the desired or target E-field. However, a low cost PIN detector 54 of the feed-back path 46 only detects optical power $|E(t)|^2$, so all phase information is lost. In addition, such a low cost PIN detector 54 will also tend to detect only the low-frequency portion of the optical signal E-field $E_O(t)$. Consequently, a direct comparison between actual and target E-fields is not possible, with a low cost, low speed PIN detector 54 of the type contemplated by the present invention. In addition, since the overall system response is dependent on many variables, such a direct comparison does not always provide useful information as to which parameter should be changed to remove any detected error.

Accordingly, the present invention provides cost functions which are indirectly indicative of features of the output optical E-field $E_O(t)$, and dependent on a parameter of the signal path. More particularly, each cost function defines an n-dimensional "control surface" which relates a set of one or more detectable artefacts of the output optical E-field $E_O(t)$ to a parameter of the signal path. The cost function value is controlled by adjusting the involved signal parameter, and is indirectly indicative of a respective feature of the output optical E-field $E_O(t)$. With this arrangement, desired features of the output optical E-field $E_O(t)$ can be obtained by progressively adjusting the parameter (e.g. in a step-wise manner) to drive the cost function to a predetermined value which corresponds with a desired feature of the output optical signal.

Representative optical signal features which can be controlled in this manner include, but are not necessarily limited to: polarization state; and balance between the Re and Im components of the E-field $E_O(t)$.

Representative path parameters contemplated in the present invention include: the target optical E-field (via the compensation function C[ ]); the digital drive signals $V_x(n)$ (via the linearizer transfer function T[ ]), RF stage path gain (via the VGAs 38x), and the bias point of the E/O converter 22.

Preferably, cost functions are selected to be dependent upon a single parameter, so as to constrain degrees of freedom. Where this is not possible, then the cost function should be formulated to be as sensitive as possible to a desired parameter, and comparatively insensitive to other parameters. In addition, cost functions are preferably defined in such a way as to be largely independent of device calibration. This may be accomplished through the formulation of the cost function itself and/or selection of a desired or target cost function value. For example, in some cases, the cost function can be formulated such that the desired optical E-field feature corresponds with a known value of the cost function, independently of device calibration. In other cases, the cost function can be formulated such that the desired optical E-field feature corresponds with a local maximum, minimum or zero of the cost function. The location of these points on the cost function control surface will normally be independent of device calibration, even though the actual value (in the case of maxima and minima) will not be.

In some cases, device calibration variables are known, or can be calculated, and used in computing the cost function. Computation of device calibration variables relies on the fact that insertion of the dither into the multi-bit digital stage 30 of the signal path enables high precision control over the dither signal. This precision enables a correspondingly precise calculation of at least some device calibration variables, such as, for example, the coupling efficiency of each branch MZ interferometer 28x (as will be described in greater detail below). Knowledge of device calibration variables in this manner (whether known in advance or calculated as described above) enables a path parameter to be controlled to yield a desired feature of the output optical signal which does not correspond with any of a maximum, minimum or zero of the cost function control surface.

In the following discussion, representative control loops are described, along with their associated dithers and cost functions.

Bias Control Loop

The purpose of the bias control loop is to drive the MZ interferometer 26 to an optimum bias point, so as to achieve desired optical waveform characteristics. In particular, at the optimum modulator bias setting, a change in the target E-field amplitude $A_t$ will produce a linearly proportional change in the actual optical E-field amplitude at the modulator output. While various techniques are known for controlling the bias point of an MZ interferometer driven by a bi-state drive signal, it can be shown that these techniques will not work satisfactorily in the case of an MZ interferometer driven by high resolution drive signals $S_x(t)$ of the type contemplated in the present invention.

In accordance with the present invention, the bias control loop involves inserting a multiplicative low frequency binary (square wave) dither $d(A_d, \omega_d)$, where $A_d$ is the amplitude and $\omega_d$ is the frequency, is applied to the amplitude $A_t$ of the target E-field $E_T(t)$. Thus, in the case of a multiplicative dither, $E_T(t) \rightarrow (1+d)Ae^{j\omega_c t}$, where $\omega_c$ is the carrier frequency of the target optical E-field $E_T(t)$. The dither magnitude $(A_d)$ may, for example, be 0.01. The dither $d(A_d, \omega)$ produces artefacts in the output optical signal $E_O(t)$, which can be detected as amplitude modulation of the optical power $|E(t)|^2$ at the dither frequency $\omega_d$. The peak-to-peak amplitude $D_m$ of the dither component can be detected using a normalized correlator 58 in the detector block 52 of the feed-back path 46.

It can be shown that, for unity common gain and a balanced system, the dither gain $$\frac{D_m}{A_d} = 2,$$

independent of the desired electric field vector. It can also be shown that the dither gain is relatively insensitive to errors in the common and relative gains, particularly near their respective target values. Accordingly, the dither gain $$\frac{D_m}{A_d}$$

provides a useful cost function for controlling the bias voltage $V_{BIAS}$. It is a simple matter to implement a stepping function that incrementally adjusts the bias voltage $V_{BIAS}$ to drive the dither gain $$\frac{D_m}{A_d}$$

to a desired target value (e.g.

$$\frac{D_m}{A_d} = 2).$$

Preferably, the common and relative gains are held constant during adjustment of bias voltage $V_{BIAS}$.

System Balance Control Loop

The purpose of the System Balance control loop is to ensure that the branches of the optical transmitter (i.e. between the linearizer 18 and the output 24 of the complex E/O converter 22) are balanced. In practice, this means that equal values of the digital drive signals $V_R(n)$ and $V_L(n)$ produce equal phase rotations of the two branch optical signals $E_R(t)$ and $E_L(t)$. This, in turn, implies that the common voltage component of the digital drive signals $V_R(n)$ and $V_L(n)$ will not produce any amplitude modulation of the output optical E-field.

With the MZ interferometer 26 optimally biased as described above, any residual imbalance will be due to differences in the respective gains of the signal paths traversed by the drive signals between the linearizer 18 and the complex E/O converter 22, and the coupling efficiencies $p_{tx}$ of the MZ interferometer 26. Both of these error sources can be compensated by suitable adjustment of the RF path gains via the VGAs 38x.

In accordance with the present invention, the system balance control loop involves inserting a common low frequency dither $d(t)=A_d \cos(\omega_d t)$ into both drive signals $V_x(t)$. The dither $d(t)$ produces artefacts in the output optical signal $E_O(t)$, which can be detected as amplitude modulation of the optical power $|E(t)|^2$ at the dither frequency $\omega_d$. The peak-to-peak amplitude $D_m$ of the dither component can be detected using a normalized correlator 58 in the detector block 52 of the feed-back path 46.

The dither $d(t)$ can be either additive or multiplicative, as desired, and may conveniently be inserted by the linearizer 18. It should be noted that the dither $d(t)$ is characterized as a sinusoidal signal for convenience only. Any dither signal waveform may be used.

It can be shown that, for a balanced system, the (normalized) modulation depth $$\frac{D_m}{|E(t)|^2}$$

is a minimum (ideally zero), independently of device variations and coupling efficiency. Accordingly, it provides a useful cost function for controlling the VGA gains $G_R$ and $G_L$.

In this respect, it is useful to decompose the VGA gains $G_R$ and $G_L$ into common gain $G_{com}$ and relative gain $G_{rel}$, thus $G_R = G_{com} + G_{rel}$ and $G_L = G_{com} - G_{rel}$. Using this formulation, it is a simple matter to implement a stepping function that incrementally adjusts the relative gain $G_{rel}$ to drive the normalized modulation depth $$\frac{D_m}{|E(t)|^2}$$

to an optimum value (in this case, a local minimum which is ideally $$\frac{D_m}{|E(t)|^2} = 0),$$

and thereby achieve system balance. It can be shown that the relative gain $G_{rel}$ can be used to balance the branches 28 of the E/O converter 4 in this manner, independently of common gain setting, bias error, and even extinction ratio. However, if the modulator is biased near the peak or trough of its transfer curve, then the relative gain control surface would be quite shallow, resulting in poor convergence. Therefore, to achieve optimal convergence behaviour, one has to make sure the modulator is biased sufficiently away from its peak or trough while relative gain control loop is converging.

Common Gain Control Loop

The purpose of the Common Gain control loop is to optimize the overall system gain of the optical transmitter (i.e. between the signal processor 16 and the output 24 of the E/O converter 22). In practice, this means that a change in the phase of the target E-field produces an equal change in the output optical E-field $E_O(t)$. Since the output E-field phase is determined by the common drive signal components, phase error can be controlled by adjusting the common gain $G_{com}$. In the following paragraphs two alternative Common Gain control loops are described. The first uses an analog dither inserted via the modulator bias signal. The second approach uses digital dithers inserted by the signal processor 16.

Analog Dither

In this technique, an additive dither signal $d(t)=A_d \cos(\omega_d t)$ is applied to the modulator bias signal $V_{bias}$. Thus $V_{bias} \rightarrow V_{bias} + A_d \cos(\omega_d t)$. The dither $d(t)$ produces artefacts in the output optical signal $E_O(t)$, which can be detected as amplitude modulation of the optical power $|E(t)|^2$ at the dither frequency $\omega_d$. The peak-to-peak amplitude $D_m$ of the dither component can be detected using a normalized correlator 58 in the detector block 52 of the feed-back path 46.

It can be shown that for an optimally biased modulator, the target dither gain $$\frac{D_m}{A_d},$$

would be a function of the desired electric field vector. In the special case of the desired electric field being a dispersion compensated waveform, the target dither gain is a deterministic function of the dispersion compensation target. It can also be shown that using the above dithering mechanism, at or anywhere near the optimal bias condition, the common gain control surface is a monotonically decreasing function of the common gain factor. This largely contributes to the excellent convergence behaviour of the common gain control loop. It is a simple matter to implement a stepping function that incrementally adjusts the Common Gain $G_{com}$ to drive the dither gain $$\frac{D_m}{A_d}$$

to a desired target value. A limitation of this approach is that it is highly sensitive to modulator bias error. This difficulty is overcome by the use of the digital dither technique, which is described below.

Digital Dither

In this technique, a pair of low frequency dithers $d_1(t)=A_{d1} \cos(\omega_{d1}t)$ and $d_2(t)=A_{d2} \cos(\omega_{d2}t)$ are inserted into each of the orthogonal components $E_I$ and $E_Q$ of the target optical E-field E(t). Thus:

$$E_I \rightarrow E_{I+d1}(t)\cos(\theta) + d_2(t)\sin(\theta)$$

and $$E_Q \rightarrow E_{Q-d1}(t)\sin(\theta) + d_2(t)\cos(\theta)$$

The terms $\sin(\theta)$ and $\cos(\theta)$ have the effect of rotating the phases of the dither signals $d_1$ and $d_2$ by $\theta$, relative to the target E-field E(t). This phase rotation has the effect of increasing the depth of the cost function control surface and thereby improves stability and convergence behaviour of the control loop. In practice a phase rotation of about $\theta=45°$ has been found to be optimal.

The dithers $d_1$, $d_2$ produce artefacts in the output optical signal, which can be detected as amplitude modulation of the optical power $|E(t)|^2$ at a frequency $\omega_{beat}=|\omega_{d1}-\omega_{d2}|$ corresponding to a beat signal formed by the two dithers $d_1$ and $d_2$. The amplitude $H_{beat}$ of the beat component can be detected using a normalized correlator 58 in the detector block 52 of the feed-back path 46.

For an optimally biased modulator and a balanced system and a unity common gain factor, the $E_I$ and $E_Q$ orthogonality means that there should be no beating between dithers applied to $E_I$ and $E_Q$. Therefore, one expects that the beat component amplitude $H_{beat}$ will be a minimum (ideally zero) at the optimum value of the common gain $G_{com}$. It is a simple matter to implement a stepping function that incrementally adjusts the Common Gain $G_{com}$ to drive the beat component amplitude $H_{beat}$ to a minimum value.

The embodiment(s) of the invention described above is(are) intended to be exemplary only. The scope of the invention is therefore intended to be limited solely by the scope of the appended claims.

We claim:

1. A method of controlling a polar optical transmitter comprising a signal path comprising a multi-bit digital stage cascaded with an analog stage having a pair of branches for supplying a respective drive signal to each branch of a dual branch Mach-Zehnder (MZ) modulator, the method comprising steps of:

independently dithering a set of two or more selected components of a signal traversing the signal path using a respective digital dither signal for each selected component;

detecting at least one artefact of the dither signals in an optical signal at an output of the MZ modulator; and adjusting at least one parameter of the transmitter based on the detection result;

wherein the step of adjusting at least one parameter of the transmitter comprises steps of:

calculating a cost function value based on the detected artefacts; and adjusting the at least one parameter of the transmitter based on the calculated cost function value wherein each cost function is a selected function of one or more of the detected artefacts, which is dependent upon a respective parameter;

wherein the cost function defines a control surface which has either a maximum or a minimum corresponding to a desired feature of the output optical E-field, and wherein the step of adjusting at least one parameter comprises adjusting the respective parameter to drive a value of the cost function to the corresponding maximum or minimum; and wherein:
the dither comprises a common dither signal applied to each drive signal;
the cost function is a modulation depth of the output optical signal at a frequency corresponding to that of the dither signal; and
the parameter is a system balance of the signal path.

2. A method as claimed in claim 1, wherein the set of selected components comprises any two or more of:
a feature of a desired optical E-field;
a digital drive signal derived from the desired optical E-field;
a gain of the analog stage of the signal path;
a bias voltage of the MZ modulator.

3. A method as claimed in claim 2, wherein the feature of the target optical E-field comprises anyone or more of:
a Cartesian coordinate component of the target optical E-field;
a polar coordinate component of the target optical E-field;
an E-field vector at a selected phase offset relative to the target optical E-field.

4. A method as claimed in claim 1, wherein the gain of the analog stage of the signal path comprises anyone or more of a common gain $G_{com}$, and a relative gain $G_{rel}$.

5. A method as claimed in claim 1, wherein the at least one artefact comprises any one or more of:
one or more harmonics of a respective dither signal; and
a selected beat of two or more dither signals.

6. A method as claimed in claim 1, wherein the step of adjusting at least one parameter comprises adjusting a relative gain of analog stage to drive a value of the cost function to a minimum.

7. A method of controlling a polar optical transmitter comprising a signal path comprising a multi-bit digital stage cascaded with an analog stage having a pair of branches for supplying a respective drive signal to each branch of a dual branch Mach-Zehnder (MZ) modulator, the method comprising steps of:
independently dithering a set of two or more selected components of a signal traversing the signal path using a respective digital dither signal for each selected component;
detecting at least one artefact of the dither signals in an optical signal at an output of the MZ modulator; and
adjusting at least one parameter of the transmitter based on the detection result;
wherein the step of adjusting at least one parameter of the transmitter comprises steps of:
calculating a cost function value based on the detected artefacts; and
adjusting the at least one parameter of the transmitter based on the calculated cost function value.

wherein each cost function is a selected function of one or more of the detected artefacts, which is dependent upon a respective parameter;

wherein the cost function defines a control surface which has either a maximum or a minimum corresponding to a desired feature of the output optical E-field, and wherein the step of adjusting at least one parameter comprises adjusting the respective parameter to drive a value of the cost function to the corresponding maximum or minimum; and wherein:
the dither comprises a pair of low frequency dither signals inserted into each one of a pair of orthogonal components $E_I$ and $E_Q$ of the target optical E-field;
the cost function is a modulation depth of the output optical signal at a beat frequency of the two dither signals; and
the parameter is a common gain of the signal path.

8. A method as claimed in claim 7, wherein the step of adjusting at least one parameter comprises adjusting the common gain to drive a value of the cost function to a minimum.

9. A method as claimed in claim 7, wherein the set of selected components comprises any two or more of:
a feature of a desired optical E-field;
a digital drive signal derived from the desired optical E-field;
a gain of the analog stage of the signal path;
a bias voltage of the MZ modulator.

10. A method as claimed in claim 9, wherein the step of adjusting at least one parameter comprises adjusting a bias voltage of the MZ modulator to drive a value of the cost function to $$\frac{D_m}{A_d} = 2.$$

11. A method as claimed in claim 9, wherein the feature of the target optical E-field comprises anyone or more of:
a Cartesian coordinate component of the target optical E-field;
a polar coordinate component of the target optical E-field;
an E-field vector at a selected phase offset relative to the target optical E-field.

12. A method as claimed in claim 7, wherein the gain of the analog stage of the signal path comprises anyone or more of a common gain $G_{com}$ and a relative gain $G_{rel}$.

13. A method as claimed in claim 7, wherein the at least one artefact comprises any one or more of:
one or more harmonics of a respective dither signal; and
a selected beat of two or more dither signals.

14. A method of controlling a polar optical transmitter comprising a signal path comprising a multi-bit digital stage cascaded with an analog stage having a pair of branches for supplying a respective drive signal to each branch of a dual branch Mach-Zehnder (MZ) modulator, the method comprising steps of:
independently dithering a set of two or more selected components of a signal traversing the signal path using a respective digital dither signal for each selected component;
detecting at least one artefact of the dither signals in an optical signal at an output of the MZ modulator; and
adjusting at least one parameter of the transmitter based on the detection result;

wherein the step of adjusting at least one parameter of the transmitter comprises steps of:
  calculating a cost function value based on the detected artefacts; and
  adjusting the at least one parameter of the transmitter based on the calculated cost function value
wherein each cost function is a selected function of one or more of the detected artefacts, which is dependent upon a respective parameter;
wherein the cost function defines a control surface having a predetermined value which corresponds to a desired feature of the output optical E-field, and wherein the step of adjusting at least one parameter comprises adjusting the respective parameter to drive a value of the cost function to the predetermined value; and
wherein:
  the dither is a low frequency binary dither applied to an amplitude of the target optical E-field;
  the cost function is a dither gain $$\frac{D_m}{A_d},$$

where $A_d$ is a magnitude of the dither signal and $D_m$ is a detected modulation depth of the output optical signal at a frequency corresponding to that of the dither signal; and
  the parameter is a bias point of the MZ modulator.

15. A method as claimed in claim 14, wherein the set of selected components comprises any two or more of:
  a feature of a desired optical E-field;
  a digital drive signal derived from the desired optical E-field;
  a gain of the analog stage of the signal path;
  a bias voltage of the MZ modulator.

16. A method as claimed in claim 15, wherein the feature of the target optical E-field comprises anyone or more of:
  a Cartesian coordinate component of the target optical E-field;
  a polar coordinate component of the target optical E-field;
  an E-field vector at a selected phase offset relative to the target optical E-field.

17. A method as claimed in claim 15, wherein the step of adjusting at least one parameter comprises adjusting the common gain to drive a value of the cost function to a pre-computed dither gain target $$\frac{D_m}{A_d}.$$

18. A method as claimed in claim 14, wherein the gain of the analog stage of the signal path comprises anyone or more of a common gain $G_{com}$ and a relative gain $G_{rel}$.

19. A method as claimed in claim 14, wherein the at least one artefact comprises any one or more of:
  one or more harmonics of a respective dither signal; and
  a selected beat of two or more dither signals.

20. A method of controlling a polar optical transmitter comprising a signal path comprising a multi-bit digital stage cascaded with an analog stage having a pair of branches for supplying a respective drive signal to each branch of a dual branch Mach-Zehnder (MZ) modulator, the method comprising steps of:
  independently dithering a set of two or more selected components of a signal traversing the signal path using a respective digital dither signal for each selected component;
  detecting at least one artefact of the dither signals in an optical signal at an output of the MZ modulator; and
  adjusting at least one parameter of the transmitter based on the detection result;
wherein the step of adjusting at least one parameter of the transmitter comprises steps of:
  calculating a cost function value based on the detected artefacts; and
  adjusting the at least one parameter of the transmitter based on the calculated cost function value.
wherein each cost function is a selected function of one or more of the detected artefacts, which is dependent upon a respective parameter;
wherein the cost function defines a control surface having a predetermined value which corresponds to a desired feature of the output optical E-field, and wherein the step of adjusting at least one parameter comprises adjusting the respective parameter to drive a value of the cost function to the predetermined value; and
wherein:
  the dither is a low frequency dither signal applied to a bias voltage of the MZ modulator;
  the cost function is a dither gain $$\frac{D_m}{A_d},$$

where $A_d$ is a magnitude of the dither signal and $D_m$ is a detected modulation depth of the output optical signal at a frequency corresponding to that of the dither signal; and
  the parameter is a common gain of the signal path.

21. A method as claimed in claim 20, wherein the set of selected components comprises any two or more of:
  a feature of a desired optical E-field;
  a digital drive signal derived from the desired optical E-field;
  a gain of the analog stage of the signal path;
  a bias voltage of the MZ modulator.

22. A method as claimed in claim 21, wherein the feature of the target optical E-field comprises anyone or more of:
  a Cartesian coordinate component of the target optical E-field;
  a polar coordinate component of the target optical E-field;
  an E-field vector at a selected phase offset relative to the target optical E-field.

23. A method as claimed in claim 20, wherein the gain of the analog stage of the signal path comprises anyone or more of a common gain $G_{com}$ and a relative gain $G_{rel}$.

24. A method as claimed in claim 20, wherein the at least one artefact comprises any one or more of:
  one or more harmonics of a respective dither signal; and
  a selected beat of two or more dither signals.

25. A system for controlling a polar optical transmitter comprising a signal path comprising a multi-bit digital stage cascaded with an analog stage having a pair of branches for supplying a respective drive signal to each branch of a dual branch Mach-Zehnder (MZ) modulator, the system comprising:

means for independently dithering a set of two or more selected components of a signal traversing the signal path using a respective digital dither signal for each selected component;

a feedback path for detecting at least one artefact of the dither signals in an optical signal at an output of the MZ modulator; and a controller for adjusting at least one parameter of the transmitter based on the detection result;

wherein the controller is adapted to:
calculate a cost function value based on the detected artefacts; and
adjust the at least one parameter of the transmitter based on the calculated cost function value wherein each cost function is a selected function of one or more of the detected artefacts, which is dependent upon a respective parameter;

wherein the cost function defines a control surface which has either a maximum or a minimum corresponding to a desired feature of the output optical E-field, and wherein the controller is adapted to adjust the respective parameter to drive a value of the cost function to the corresponding maximum or minimum; and wherein:
the dither comprises common dither signal applied to each drive signal;
the cost function is a modulation depth of the output optical signal at a frequency
corresponding to that of the dither signal; and
the parameter is a system balance of the signal path.

26. A system as claimed in claim 25, wherein the set of selected components comprises any two or more of:
a feature of a desired optical E-field;
a digital drive signal derived from the desired optical E-field;
a gain of the analog stage of the signal path;
a bias voltage of the MZ modulator.

27. A system as claimed in claim 26, wherein the feature of the target optical E-field comprises anyone or more of:
a Cartesian coordinate component of the target optical E-field;
a polar coordinate component of the target optical E-field;
an E-field vector at a selected phase offset relative to the target optical E-field.

28. A system as claimed in claim 26, wherein the gain of the analog stage of the signal path comprises anyone or more of a common gain $G_{com}$ and a relative gain $G_{rel}$.

29. A system as claimed in claim 25, wherein the at least one artefact comprises anyone or more of:
one or more harmonics of a respective dither signal; and
a selected beat of two or more dither signals.

30. A system as claimed in claim 25, wherein the controller is adapted to adjust a relative gain of the analog stage to drive a value of the cost function to a minimum.

31. A system for controlling a polar optical transmitter comprising a signal path comprising a multi-bit digital stage cascaded with an analog stage having a pair of branches for supplying a respective drive signal to each branch of a dual branch Mach-Zehnder (MZ) modulator, the system comprising:
means for independently dithering a set of two or more selected components of a signal traversing the signal path using a respective digital dither signal for each selected component;
a feedback path for detecting at least one artefact of the dither signals in an optical signal at an output of the MZ modulator; and
a controller for adjusting at least one parameter of the transmitter based on the detection result;
wherein the controller is adapted to:
calculate a cost function value based on the detected artefacts; and
adjust the at least one parameter of the transmitter based on the calculated cost function value
wherein each cost function is a selected function of one or more of the detected artefacts, which is dependent upon a respective parameter;
wherein the cost function defines a control surface which has either a maximum or a minimum corresponding to a desired feature of the output optical E-field, and wherein the controller is adapted to adjust the respective parameter to drive a value of the cost function to the corresponding maximum or minimum; and
wherein:
the dither comprises pair of low frequency dither signals inserted into each one of a pair of orthogonal components $E_I$ and $E_Q$ of the target optical E-field;
the cost function is a modulation depth of the output optical signal at a beat frequency of the two dither signals; and
the parameter is a common gain of the signal path.

32. A system as claimed in claim 31, wherein the set of selected components comprises any two or more of:
a feature of a desired optical E-field;
a digital drive signal derived from the desired optical E-field;
a gain of the analog stage of the signal path;
a bias voltage of the MZ modulator.

33. A system as claimed in claim 32, wherein the feature of the target optical E-field comprises anyone or more of:
a Cartesian coordinate component of the target optical E-field;
a polar coordinate component of the target optical E-field;
an E-field vector at a selected phase offset relative to the target optical E-field.

34. A system as claimed in claim 32, wherein the gain of the analog stage of the signal path comprises anyone or more of a common gain $G_{com}$ and a relative gain $G_{rel}$.

35. A system as claimed in claim 31, wherein the at least one artefact comprises anyone or more of:
one or more harmonics of a respective dither signal; and
a selected beat of two or more dither signals.

36. A system as claimed in claim 31, wherein the controller is adapted to adjust the common gain to drive a value of the cost function to a minimum.

37. A system for controlling a polar optical transmitter comprising a signal path comprising a multi-bit digital stage cascaded with an analog stage having a pair of branches for supplying a respective drive signal to each branch of a dual branch Mach-Zehnder (MZ) modulator, the system comprising:
means for independently dithering a set of two or more selected components of a signal traversing the signal path using a respective digital dither signal for each selected component;
a feedback path for detecting at least one artefact of the dither signals in an optical signal at an output of the MZ modulator; and
a controller for adjusting at least one parameter of the transmitter based on the detection result;
wherein the controller is adapted to:
calculate a cost function value based on the detected artefacts; and adjust the at least one parameter of the transmitter based on the calculated cost function value wherein each cost function is a selected function of one or more of the detected artefacts, which is dependent upon a respective parameter;

wherein the cost function defines a control surface having a predetermined value which corresponds to a desired feature of the output optical E-field, and wherein the controller is adapted to adjust the respective parameter to drive a value of the cost function to the predetermined value; and wherein:
the dither is a low frequency binary dither applied to an amplitude of the target optical E-field;
the cost function is a dither gain $$\frac{D_m}{A_d},$$

where $A_d$ is a magnitude of the dither signal and $D_m$ is a detected modulation depth of the output optical signal at a frequency corresponding to that of the dither signal; and
the parameter is a bias point of the MZ modulator.

38. A system as claimed in claim 37, wherein the set of selected components comprises any two or more of:
a feature of a desired optical E-field;
a digital drive signal derived from the desired optical E-field;
a gain of the analog stage of the signal path;
a bias voltage of the MZ modulator.

39. A system as claimed in claim 38, wherein the feature of the target optical E-field comprises anyone or more of:
a Cartesian coordinate component of the target optical E-field;
a polar coordinate component of the target optical E-field;
an E-field vector at a selected phase offset relative to the target optical E-field.

40. A system as claimed in claim 38, wherein the gain of the analog stage of the signal path comprises anyone or more of a common gain $G_{com}$ and a relative gain $G_{rel}$.

41. A system as claimed in claim 37, wherein the at least one artefact comprises anyone or more of:
one or more harmonics of a respective dither signal; and
a selected beat of two or more dither signals.

42. A system as claimed in claim 37, wherein the controller is adapted to adjust the bias voltage of the MZ modulator to drive a value of the cost function to $$\frac{D_m}{A_d} = 2.$$

43. A system as claimed in claim 38, wherein the controller is adapted to adjust the common gain to drive a value of the cost function to a pre-computed dither gain target $$\frac{D_m}{A_d}.$$

44. A system for controlling a polar optical transmitter comprising a signal path comprising a multi-bit digital stage cascaded with an analog stage having a pair of branches for supplying a respective drive signal to each branch of a dual branch Mach-Zehnder (MZ) modulator, the system comprising:
means for independently dithering a set of two or more selected components of a signal traversing the signal path using a respective digital dither signal for each selected component;
a feedback path for detecting at least one artefact of the dither signals in an optical signal at an output of the MZ modulator; and
a controller for adjusting at least one parameter of the transmitter based on the detection result;

wherein the controller is adapted to:
calculate a cost function value based on the detected artefacts; and
adjust the at least one parameter of the transmitter based on the calculated cost function value wherein each cost function is a selected function of one or more of the detected artefacts, which is dependent upon a respective parameter;

wherein the cost function defines a control surface having a predetermined value which corresponds to a desired feature of the output optical E-field, and wherein the controller is adapted to adjust the respective parameter to drive a value of the cost function to the predetermined value; and wherein:
the dither is a low frequency dither signal applied to a bias voltage of the MZ modulator;
the cost function is a dither gain $$\frac{D_m}{A_d},$$

where $A_d$ is a magnitude of the dither signal and $D_m$ is a detected modulation depth of the output optical signal at a frequency corresponding to that of the dither signal; and
the parameter is a common gain of the signal path.

45. A system as claimed in claim 44, wherein the set of selected components comprises any two or more of:
a feature of a desired optical E-field;
a digital drive signal derived from the desired optical E-field;
a gain of the analog stage of the signal path;
a bias voltage of the MZ modulator.

46. A system as claimed in claim 45, wherein the feature of the target optical E-field comprises anyone or more of:
a Cartesian coordinate component of the target optical E-field;
a polar coordinate component of the target optical E-field;
an E-field vector at a selected phase offset relative to the target optical E-field.

47. A system as claimed in claim 45, wherein the gain of the analog stage of the signal path comprises anyone or more of a common gain $G_{com}$ and a relative gain $G_{rel}$.

48. A system as claimed in claim 44, wherein the at least one artefact comprises anyone or more of:
one or more harmonics of a respective dither signal; and
a selected beat of two or more dither signals.

* * * * *